United States Patent
Ohyama et al.

(10) Patent No.: US 8,838,918 B2
(45) Date of Patent: Sep. 16, 2014

(54) INFORMATION PROCESSING APPARATUS AND DATA BACKUP METHOD

(75) Inventors: Sadayuki Ohyama, Kawasaki (JP); Takanori Ishii, Kawasaki (JP); Shinnosuke Matsuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 904 days.

(21) Appl. No.: 12/362,630

(22) Filed: Jan. 30, 2009

(65) Prior Publication Data

US 2009/0198931 A1 Aug. 6, 2009

(30) Foreign Application Priority Data

Feb. 1, 2008 (JP) .................................. 2008-023195

(51) Int. Cl.
G06F 12/16 (2006.01)
G06F 3/06 (2006.01)
G06F 1/30 (2006.01)
G06F 11/14 (2006.01)

(52) U.S. Cl.
CPC ............... *G06F 1/30* (2013.01); *G06F 3/0689* (2013.01); *G06F 11/1441* (2013.01); *G06F 3/0614* (2013.01); *G06F 3/0656* (2013.01); *G06F 3/065* (2013.01)
USPC ........................... 711/162; 711/103; 711/113

(58) Field of Classification Search
None
See application file for complete search history.

(56) References Cited

U.S. PATENT DOCUMENTS

| | | | | |
|---|---|---|---|---|
| 5,799,200 | A * | 8/1998 | Brant et al. ................... | 713/340 |
| 2002/0156983 | A1* | 10/2002 | Jones et al. ................... | 711/143 |
| 2004/0103238 | A1* | 5/2004 | Avraham et al. .............. | 711/102 |
| 2005/0273551 | A1* | 12/2005 | Keays ........................... | 711/103 |
| 2007/0061511 | A1* | 3/2007 | Faber ............................ | 711/113 |
| 2007/0220227 | A1* | 9/2007 | Long ............................. | 711/165 |
| 2008/0059736 | A1* | 3/2008 | Murayama et al. ........... | 711/162 |
| 2009/0031099 | A1* | 1/2009 | Sartore ......................... | 711/162 |

FOREIGN PATENT DOCUMENTS

| | | |
|---|---|---|
| EP | 0 649 095 | 10/1994 |
| JP | 7-114500 | 5/1995 |
| JP | 2000-222292 | 8/2000 |
| JP | 2004-531814 | 10/2004 |
| WO | 02/086721 | 10/2002 |

* cited by examiner

Primary Examiner — Kaushikkumar Patel
(74) Attorney, Agent, or Firm — Stass & Halsey LLP

(57) ABSTRACT

An information processing apparatus includes a battery for providing the interior of the information processing apparatus with power; a volatile memory for storing data; a nonvolatile memory for backupping the data stored in the volatile memory; a controller for controlling backup of the data in accordance with a process comprising the steps of: saving the data into the nonvolatile memory; upon recovery of the power from the external power source, writing back the data into the volatile memory; and deleting the data saved in the nonvolatile memory; wherein when the power from an external power source to the information processing apparatus is stopped during deleting data in the nonvolatile memory, the controller selectively writes back deleted data from the volatile memory into the nonvolatile memory.

1 Claim, 15 Drawing Sheets

Fig. 5

| LOGICAL BLOCK NUMBERS | PHYSICAL BLOCK NUMBERS |
|---|---|
| LBLK_0 | BLK_0 |
| LBLK_1 | BLK_3 |
| LBLK_2 | BLK_4 |
| LBLK_3 | BLK_5 |
| LBLK_4 | BLK_6 |
| LBLK_5 | BLK_7 |
| ⋮ | ⋮ |
| LBLK_(A-1) | BLK_(A+1) |
| LBLK_A | BLK_(A+2) |

| PHYSICAL BLOCK NUMBERS 61 | LOGICAL BLOCK NUMBERS 62 |
|---|---|
| BLK_0 | LBLK_0 |
| BLK_3 | LBLK_1 |
| BLK_4 | LBLK_2 |
| BLK_5 | LBLK_3 |
| BLK_6 | LBLK_4 |
| BLK_7 | LBLK_5 |
| ⋮ | ⋮ |
| BLK_(A+1) | LBLK_(A-1) |
| BLK_(A+2) | LBLK_A |

Fig. 7

| PHYSICAL BLOCK NUMBERS (71) | FLAG (72) |
|---|---|
| BLK_0 | E |
| BLK_1 | I |
| BLK_2 | I |
| BLK_3 | E |
| BLK_4 | E |
| BLK_5 | E |
| ... | ... |
| BLK_N | E |

Fig. 9

| PHYSICAL BLOCK NUMBERS (91) | FLAG (92) |
|---|---|
| BLK_0 | N |
| BLK_1 | I |
| BLK_2 | I |
| BLK_3 | E |
| BLK_4 | E |
| BLK_5 | E |
| ⋮ | ⋮ |
| BLK_N | E |

Fig. 12

| PHYSICAL BLOCK NUMBERS (121) | FLAG (122) |
| --- | --- |
| BLK_0 | B |
| BLK_1 | I |
| BLK_2 | I |
| BLK_3 | N |
| BLK_4 | N |
| BLK_5 | N |
| ⋮ | ⋮ |
| BLK_N | E |

Fig. 13

| PHYSICAL BLOCK NUMBERS (131) | FLAG (132) |
|---|---|
| BLK_0 | E |
| BLK_1 | I |
| BLK_2 | I |
| BLK_3 | N |
| BLK_4 | N |
| BLK_5 | N |
| ⋮ | ⋮ |
| BLK_N | E |

INFORMATION PROCESSING APPARATUS AND DATA BACKUP METHOD

CROSS-REFERENCE TO RELATED APPLICATION

This application is based upon and claims the benefit of priority of the prior Japanese Patent Application No. 2008-023195 filed on Feb. 1, 2008, the entire contents of which are incorporated herein by reference.

FIELD

A certain aspect of the embodiments discussed herein is related to an information processing apparatus for storing data.

BACKGROUND

A known disk array apparatus performs write back cache in order to reduce the waiting time of a host computer that performs read/write access on the disk array apparatus.

The term "write back cache" refers to a processing operation in which an MPU (micro processing unit) in the apparatus temporarily writes, before writing data to a HDD (hard disk drive), the data to a high-speed accessible cache memory and writes back the data from the cache memory to the HDD later during idle time.

Since the cache memory is a volatile memory, the data that remains in the cache memory needs to be saved somewhere without a loss of the data, in the case of a power loss due to a power failure or the like. For the write cache back, it is important to ensure the safety of the cache data that has not been written to the HDD and that remains in the cache memory.

In particular, in a disk array apparatus equipped with a large-capacity cache memory in order to increase the speed of the read/write access from the host computer, a large amount of cache data is written to the cache memory. This makes it even more important to ensure the safety of the cache data.

Japanese Laid-Open Patent Application Publication (Translation of PCT Application) No. 2004-531814 discloses a scheme in which, when a power failure occurs, user data stored in a cache memory is saved into a flash memory which is a nonvolatile memory before the apparatus completely loses power. Thereafter, when power is restored, the cache data is restored from the flash memory into the cache memory.

The backup data saved in the flash memory requires deletion processing after power is restored and the data is restored in the cache memory, in preparation for a next power failure. This is because the flash memory does not permit data writing unless it is initialized.

The problem in this case is that, when a power failure occurs again during the deletion processing and the disk array apparatus is turned off without backup of the deleted data, the data is completely lost and thus cannot be restored into the cache memory.

When the scheme disclosed in Japanese Laid-Open Patent Application Publication No. 2004-531814 is applied to a disk array apparatus, a large-capacity flash memory is required and a large amount of backup data is written to the flash memory during a power failure. In this case, the deletion processing of the flash memory may take several tens of seconds to several minutes, during which the risk of occurrence of a power failure also increases. Thus, it is also important to ensure the safety of data deleted.

One possible approach is that, when power supply from a main power source is lost due to a power failure, the remaining deletion processing is completed using power supplied from a battery so that the flash memory is writable, and the cache data restored in the cache memory is backed up again. This processing operation, however, requires a large amount of power and thus has the problem of increased cost of the battery.

Another possible approach is that backup data is written to one of two flash memories during a power failure and deletion processing is then performed on the flash memory in which the backup data is written, in preparation for a next power failure. With this arrangement, even if a power failure occurs during the deletion processing of the flash memory, the backup data is safely stored since no deletion processing has been performed on the other flash memory used for backing up data this time. The use of the two flash memories, however, has the problem of increased cost.

SUMMARY

According to an aspect of an embodiment, an information processing apparatus operable with power from an external power source includes: a battery for providing the interior of the information processing apparatus with power when the power from the external power source to the information processing apparatus is stopped; a volatile memory for storing data; a nonvolatile memory for backupping the data stored in the volatile memory; a controller for controlling backup of the data in accordance with a process comprising the steps of: saving the data stored in the volatile memory into the nonvolatile memory when the power from the external power source to the information processing apparatus is stopped; upon recovery of the power from the external power source, writing back the data saved in the nonvolatile memory into the volatile memory; and deleting the data saved in the nonvolatile memory successively; wherein when the power from the external power source to the information processing apparatus is stopped during deleting data in the nonvolatile memory, the controller selectively writes back deleted data from the volatile memory into the nonvolatile memory.

The object and advantages of the invention will be realized and attained by means of the elements and combinations particularly pointed out in the claims.

It is to be understood that both the forgoing general description and the following detailed description are exemplary and explanatory and are not respective of the invention, as claimed.

BRIEF DESCRIPTION OF THE DRAWINGS

FIG. 5 shows a specific example of a physical-block management table;

FIG. 6 shows a specific example of a logical-block management table;

FIG. 7 shows a specific example of a deletion-block management table;

FIG. 9 illustrates updating of the deletion-block management table;

FIG. 10 is a block diagram illustrating processing operations of the units when power is restored and power of the disk array apparatus is turned on;

FIG. 12 illustrates updating of the deletion-block management table;

FIG. 13 illustrates updating of the deletion-block management table;

DESCRIPTION OF EMBODIMENTS

Figure 1:
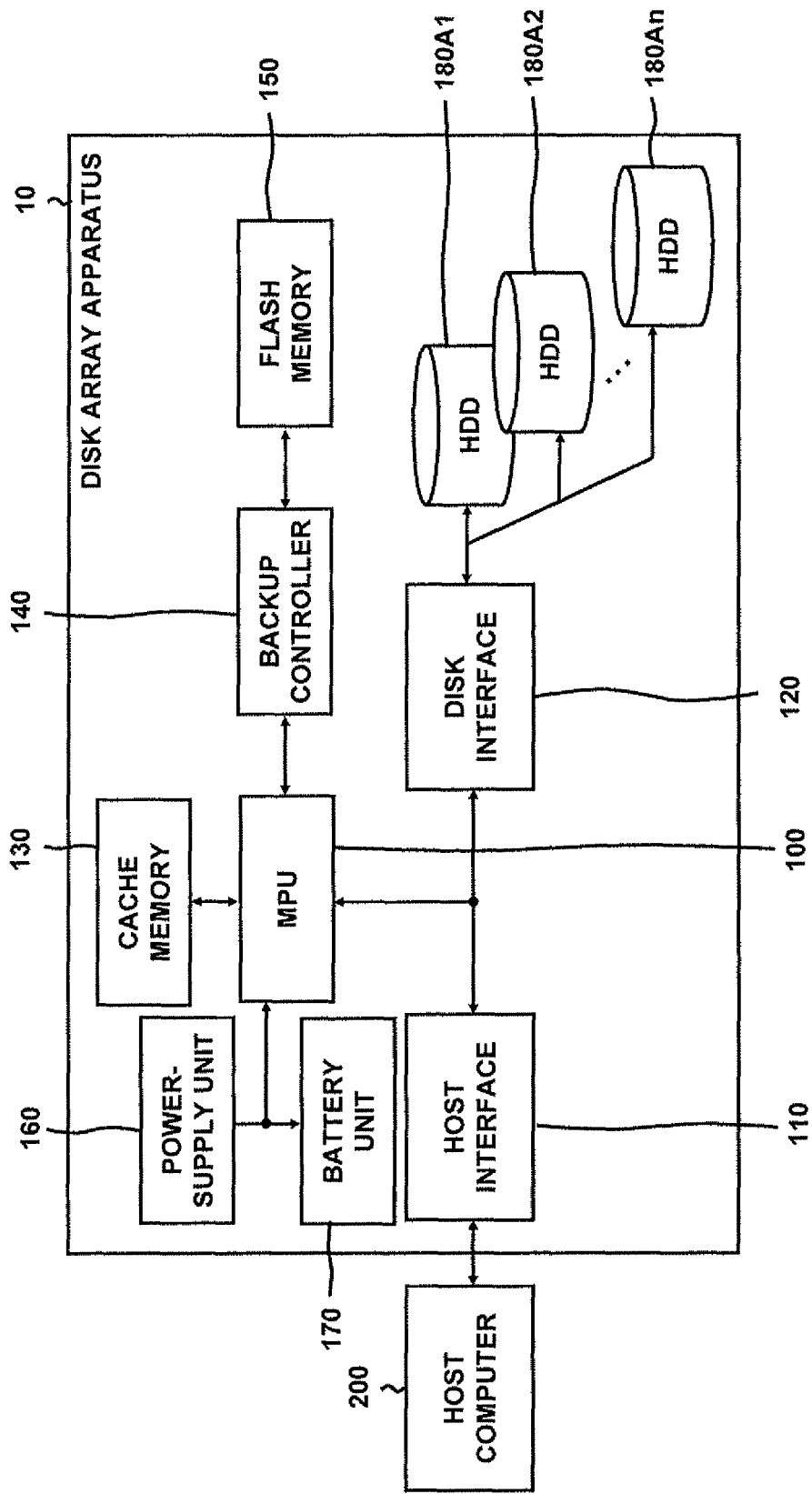
FIG. 1 is a block diagram showing a schematic configuration of a disk array apparatus according to a first embodiment of the present invention.

An embodiment according to the art will be hereinafter described with reference to the accompanying drawings.
First Embodiment FIG. 1 is a schematic block diagram showing the configuration of a disk array apparatus according to a first embodiment of the present invention. As shown, a disk array apparatus 10 is connected to a host computer 200 to serve as an auxiliary storage apparatus therefor. The disk array apparatus 10 includes an MPU (micro processing unit) 100, a host interface 110, a disk interface 120, a cache memory 130, a backup controller 140, a flash memory 150, a power-supply unit 160, a battery unit 170, and hard disks 180A1 to 180An.

Upon receiving data from the host computer 200 via the host interface 110, the MPU 100 temporarily writes the data to the cache memory 130 and immediately issues a notification of the writing completion to the host computer 200.

Thereafter, using idle time, the MPU 100 reads the cache data written to the cache memory 130 and writes the read cache data to the hard disks 180A1 to 180An via the disk interface 120. This write back cache reduces the waiting time of the host computer 200.

The cache memory 130 is a volatile memory, and thus, the written data is lost when power is lost. Thus, when the power supply from the power-supply unit 160 is lost due to a power failure, the disk array apparatus 10 switches its power supply to power supplied from the battery unit 170 to perform backup for saving the user data, stored in the cache memory 130, into the flash memory 150, which is a nonvolatile memory.

More specifically, upon detecting a power failure based on loss of power supplied from an external power source, the power-supply unit 160 issues a notification of the power-failure occurrence to the MPU 100 and also issues an instruction to the battery unit 170 so as to supply power.

Upon receiving the notification of the power-failure occurrence, the MPU 100 issues a backup-processing instruction to the backup controller 140.

backup controller 140 performs backup to write the data, written in the cache memory 130, into the flash memory 150, and then issues a backup-completion notification to the MPU 100.

The MPU 100 receives the backup-completion notification from the backup controller 140 and ends the operation of the disk array apparatus 10.

Subsequently, when the power of the disk array apparatus 10 is turned on, the MPU 100 issues an instruction for cache-data restoring processing to the backup controller 140, so that the disk array apparatus 10 can be started up in the same state as the state before the occurrence of the power failure.

As described above, the MPU 100 performs different processing operations between when the disk array apparatus 10 is turned off after the occurrence of a power failure and when the disk array apparatus 10 is properly turned off in response to a turn-off instruction.

Figure 2:
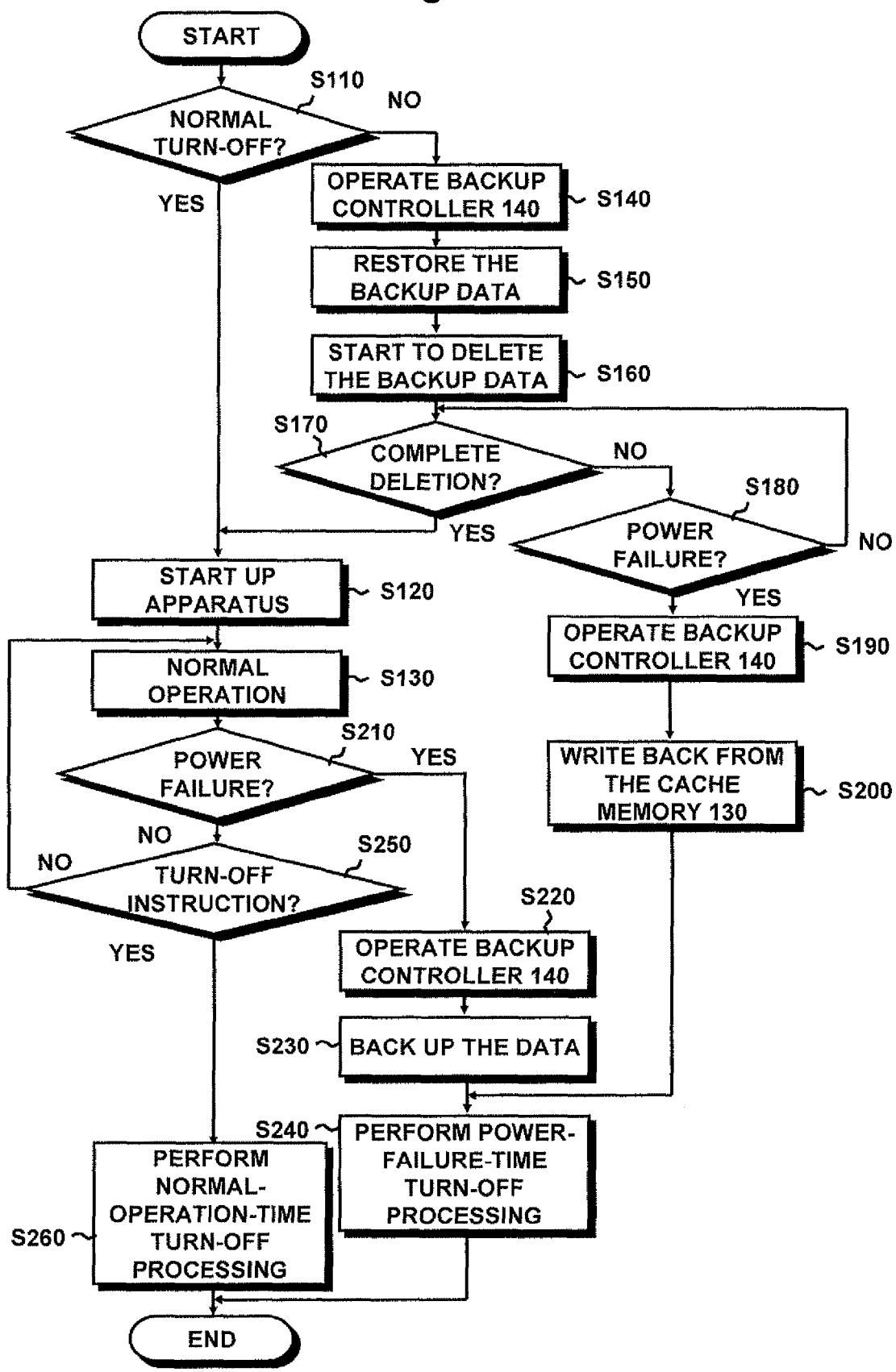
FIG. 2 is a flowchart illustrating processing operations of units in the disk array apparatus.

Processing from the startup to the turn-off of the disk array apparatus 10 will now be described in detail with reference to FIG. 2. FIG. 2 is a flowchart illustrating processing operations of the units in the disk array apparatus 10. The processing flow shown in FIG. 2 is executed each time the power of the disk array apparatus 10 is turned on.

First, on the basis of the internal state of the disk array apparatus 10, the MPU 100 determines whether or not normal turn-off processing was performed (in step S110) when it was operated last time.

When the normal turn-off processing has been performed (Yes in step S110), the MPU 100 starts up the disk array apparatus 10 (in step S120) and causes the disk array apparatus 10 to perform normal operation as an auxiliary storage apparatus for the host computer 200 (in step S130). During the normal processing, user data is stored in the cache memory 130 by the above-described write back cache.

When a power failure occurs during the normal processing (Yes in step S210), the MPU 100 causes the backup controller 140 to operate in a first storage mode (in step S220).

The backup controller 140 that is in the first storage mode backs up the data, written in the cache memory 130 by the MPU 100 during the normal operation, into the flash memory 150 (in step S230).

Subsequently, when the backup controller 140 completes the backup, the MPU 100 performs power-failure-time turn-off processing to turn off the disk array apparatus 10 (in step S240).

Referring back to step S130, when the MPU 100 receives a turn-off instruction without encountering a power failure during the normal processing (i.e., No in S210 and Yes in step S250), the MPU 100 performs normal-operation-time turn-off processing to turn off the disk array apparatus 10 (in step S260).

Referring back to step S110, when the normal turn-off processing has not been performed (No in step S110), i.e., when the processing in step S240 was performed, the MPU 100 causes the backup controller 140 to operate in a restoring mode (in step S140).

When the backup controller 140 is in the restoring mode, it restores the backup data, stored in the flash memory 150, into the cache memory 130 (in step S150). Upon completion of the restoring, the backup controller 140 starts to delete the backup data in the cache memory 150 (in step S160) to prepare for backup in a next power failure.

When the backup controller 140 completes the deletion of the backup data (Yes in step S170) without encountering a power failure during the deletion of the backup data, the MPU 100 starts up the disk array apparatus 10 (in step S120) and causes the disk array apparatus 10 to perform normal operation (in step S130).

On the other hand, when a power failure occurs while the backup controller 140 is deleting the backup data (No in step S170 and Yes in step S180), the MPU 100 causes the backup controller 140 to operate in a second storage mode (in step S190) in order to write back, from the cache memory 130, data corresponding to data deleted from the flash memory 150.

The backup controller 140 that is in the second storage mode writes back, from the cache memory 130 into the flash memory 150, data corresponding to data deleted from the flash memory 150 (in step S200).

When the backup controller 140 completes the write-back of the data, the MPU 100 performs the power-failure-time turn-off processing to turn off the disk array apparatus 10 (in step S240).

In the processing operations of the units which were described above with reference to the flowchart, particularly, the processing operation of the backup controller 140 in the second storage mode is a feature of the disk array apparatus 10 according to the present invention. The processing operation of the backup controller 140 is described below in detail.

Before the description, a description will be given of areas to which data is written, the areas being located in the cache memory 130 (accessed by the MPU 100 and the backup controller 140) and the flash memory 150 (accessed by only the backup controller 140).

Figure 3:
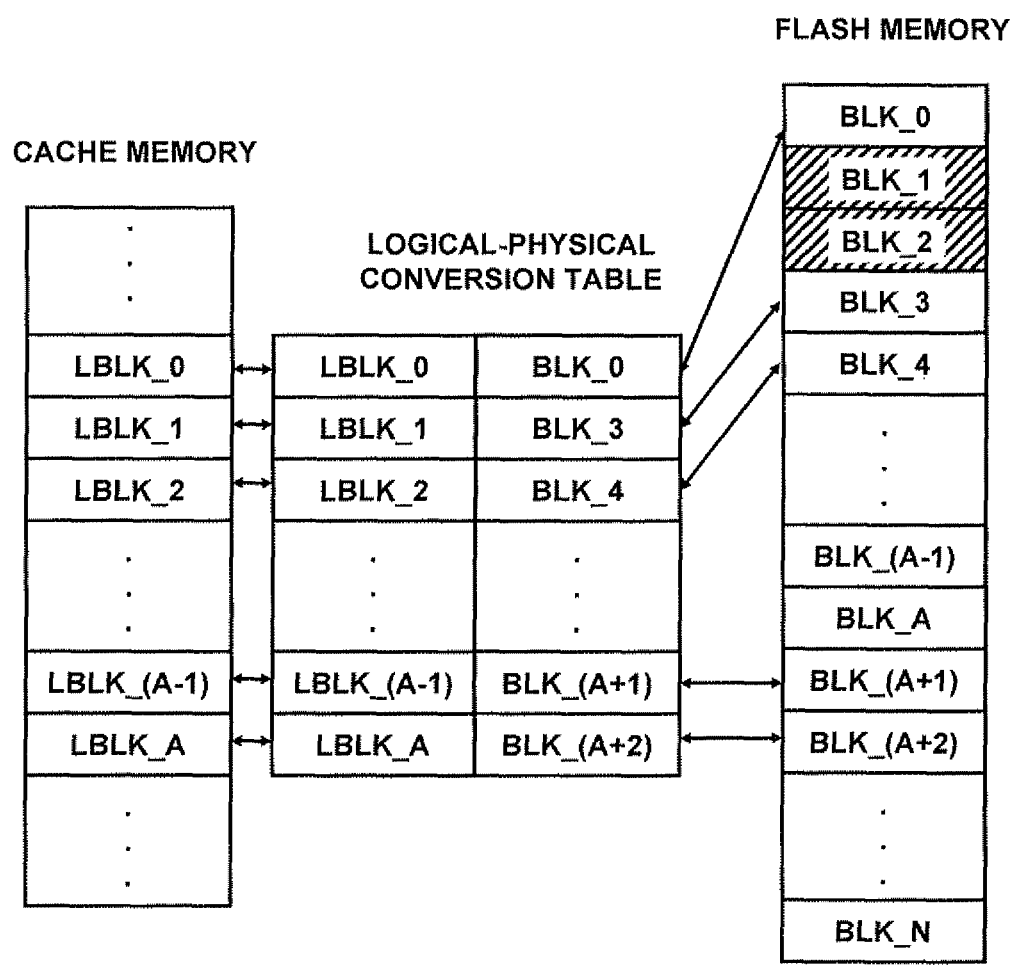
FIG. 3 illustrates areas to which data is written, the areas being located in a cache memory and a flash memory.

As shown in FIG. 3, of all areas in the cache memory 130 which are accessed by the MPU 100, particularly, areas assigned logical block numbers "LBLK_0" to "LBLK_A" are also accessed by the backup controller 140. That is, the MPU 100 stores user data in the areas assigned logical block numbers "LBLK_0" to "LBLK_A", to achieve the above-described write back cache, and the data in the areas is to be backed up.

As shown in FIG. 3, the flash memory 150 is accessed for each data deletion unit (i.e., for each block) and the blocks in the flash memory 150 are assigned physical block numbers "BLK_0" to "BLK_N" (N>A is desirable). In the flash memory 150, free blocks to which cache data is to be written are accessed by the backup controller 140. For example, the backup controller 140 writes cache data in the area assigned logical block number "LBLK_0" into the area located in the flash memory 150 and assigned physical block number "BLK_0".

Since some of the blocks in the flash memory 150 may become unusable defective blocks, the backup controller 140 searches for writable free blocks every time a power failure occurs. Thus, even if some blocks (e.g., the blocks with physical block numbers "BLK_1" and "BLK_2" in FIG. 3) become defective and the blocks to which the cache data is to be backed up are replaced with other free blocks, the MPU 100 can access the cache memory 130 by using the same logical block numbers without recognizing the block replacement. During the searching of free blocks, the backup controller 140 creates and uses logical-physical conversion table, which is used to store the relationships between the logical block numbers and the physical block number.

A description will now be given of the processing operation of the backup controller 140. First, a description will be given of individual units included in the backup controller 140.

Figure 4:
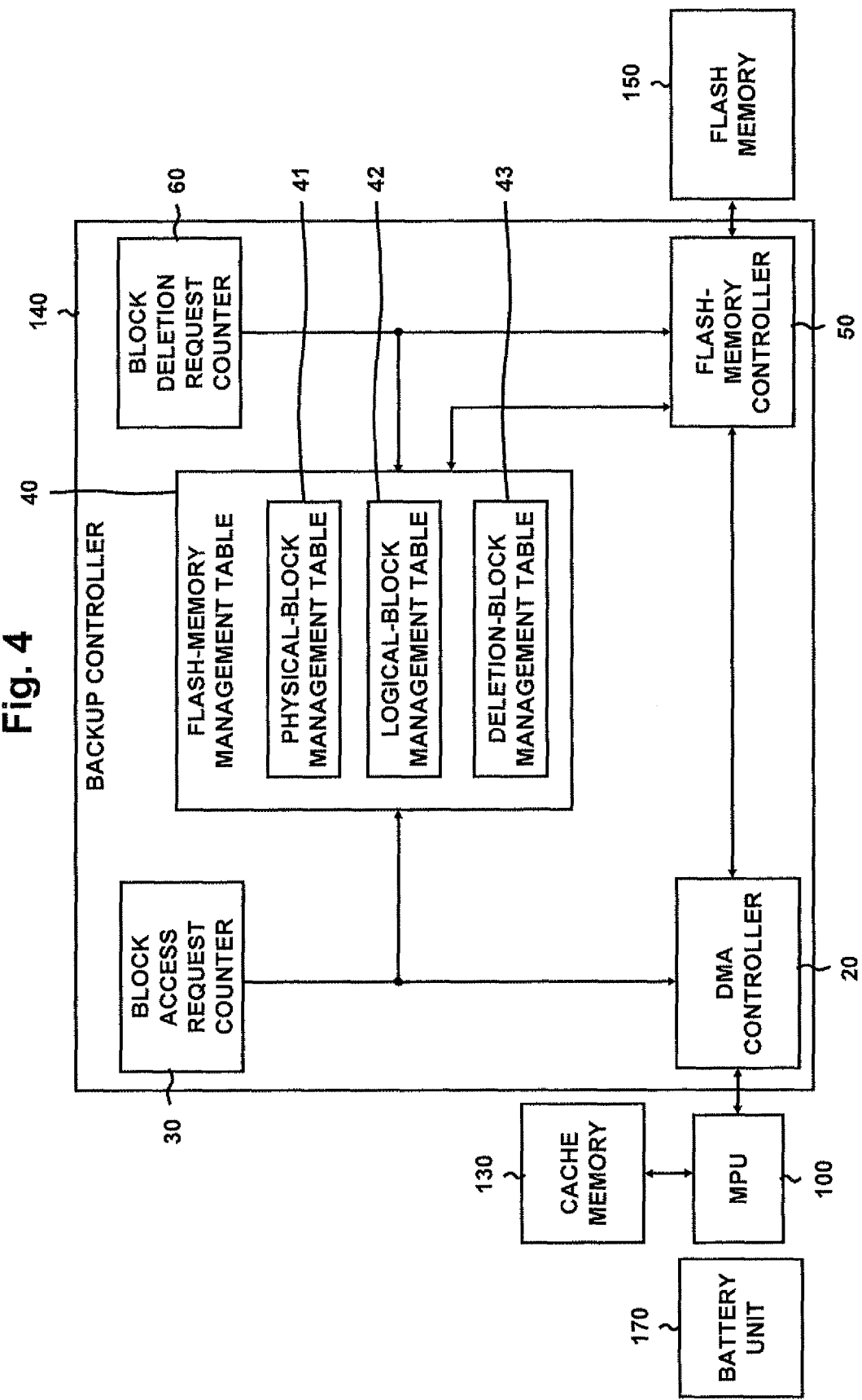
FIG. 4 is a block diagram showing the configuration of a backup controller.

FIG. 4 is a block diagram showing the configuration of the backup controller 140. As shown, the backup controller 140 includes a DMA (direct memory access) controller 20, a block access request counter 30, a flash-memory management table 40, a flash-memory controller 50, and a block deletion request counter 60.

The DMA controller 20 is connected to a local bus of the MPU 100 and writes/reads data to/from the cache memory 130. More specifically, upon receiving a notification indicating a logical block number from the block access request counter 30, the DMA controller 20 accesses a corresponding area in the cache memory 130.

The block access request counter 30 counts the logical block numbers in response to an instruction from the MPU 100 and issues an access instruction to the DMA controller 20.

The flash-memory management table 40 has a physical-block management table 41, a logical-block management table 42, and a deletion-block management table 43.

The physical-block management table 41 (see FIG. 5) is one type of the logical-physical conversion table illustrated in FIG. 3 and is used to convert logical block numbers "LBLK_0" to "LBLK_A" into physical block numbers "BLK_0" to "BLK_N".

The logical-block management table 42 (see FIG. 6) is also one type of the logical-physical conversion table illustrated in FIG. 3 and is used to convert physical block numbers "BLK_0" to "BLK_N" into logical block numbers "LBLK_0" to "LBLK_A".

The deletion-block management table 43 (see FIG. 7) is a table that contains flags indicating the states of the blocks in the flash memory 150. Examples of the flags include a flag E (indicating "already deleted", a flag N (indicating "not deleted" or "data stored"), a flag B (indicating "currently being deleted"), and a flag I (indicating "unusable"). The flag I ("unusable") indicates that the corresponding block is unusable due to a block failure in the flash memory 150.

The flash-memory controller 50 is connected to the flash memory 150 to write/read data to/from the flash memory 150 or delete data therefrom. For example, upon receiving a notification indicating a physical block number from the block deletion request counter 60, the flash-memory controller 50 accesses the corresponding area in the flash memory 150 to delete data.

The block deletion request counter 60 counts the physical block numbers in response to an instruction from the MPU 100, and issues a data-deletion instruction to the flash-memory controller 50.

Next, the processing operations of the units during a power failure will be described in detail. When a power failure occurs, the MPU 100 receives a notification of the power-failure occurrence and issues an instruction for causing the block access request counter 30 to operate in the first storage mode (refer to step S220 in FIG. 2).

Figure 8:
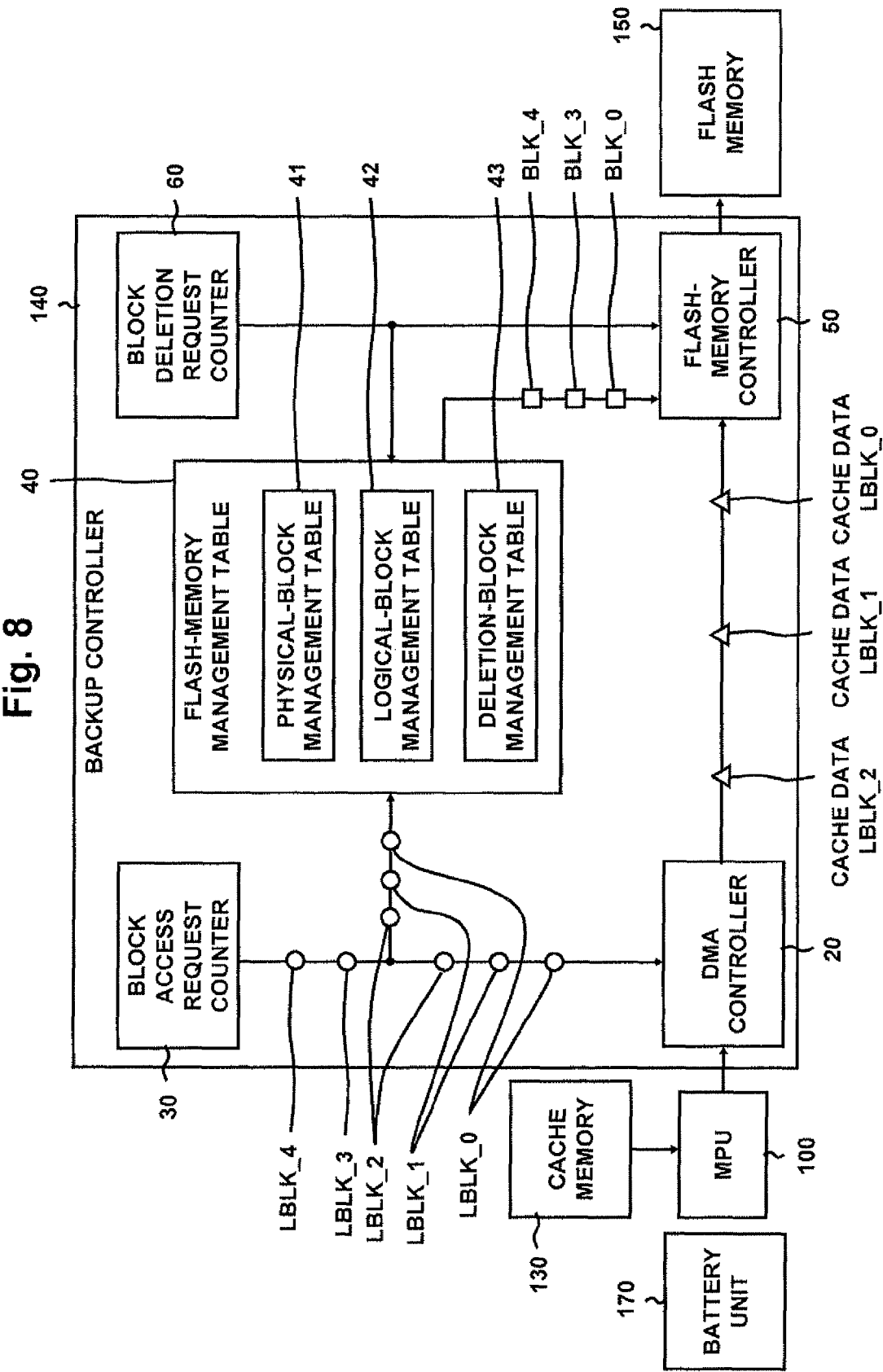
FIG. 8 is a block diagram illustrating processing operations of the units during a power failure.

The block access request counter 30 that is operating in the first storage mode sequentially issues notifications indicating "LBLK_0" to "LBLK_A" to the DMA controller 20 and the flash-memory management table 40 (see circles in FIG. 8).

The DMA controller 20 sequentially reads cache data in the cache memory 130, the areas corresponding to the indicated logical block numbers, and transfers the read cache data to the flash-memory controller 50 (see triangles in FIG. 8).

Each time the flash-memory management table 40 receives a notification indicating a logical block number, the flash-memory controller 50 refers to the deletion-block management table 43 to search the flash memory 150 for the smallest one of the physical block numbers of blocks that are currently free blocks.

In the example shown in FIG. 7, when the flash-memory management table 40 initially receives a notification indicating logical block number "LBLK_0", the flash-memory controller 50 finds "BLK_0", which is the smallest one of the physical block numbers with which the flags E ("already deleted") are associated.

The flash-memory controller 50 further stores the indicated physical block number and the found physical block number in the physical-block management table 41 in association with each other and also stores their opposite relationship in the logical-block management table 42.

The flash-memory controller 50, to which the cache data (see the triangles in FIG. 8) is sequentially transferred from the DMA controller 20, writes the cache data into the flash memory 150 on the basis of the found physical block number. During the writing, with respect to the flag for the physical block number of the block to which the cache data is actually written, the flash-memory controller 50 changes E to N (indicating "not deleted" or "data stored") in the deletion-block management table 43.

In an example shown in FIG. 9, since the flash-memory controller 50 initially found physical block number "BLK_0" and wrote the data to the block corresponding to the physical block number, the flash-memory controller 50 changes E to N with respect to the flag associated with physical block number "BLK_0".

Subsequently, when the flash-memory management table 40 receives a notification indicating logical block number "LBLK_1", the flash-memory controller 50 finds physical block number "BLK_3", which is the smallest one of the physical block numbers with which the flags E are associated ("BLK_0" is already associated with E), and likewise finds physical block number "BLK_4" next (see the rectangles in FIG. 8).

When the block access request counter 30 counts the logical block numbers up to logical block number "LBLK_A, all cache data to be backed up is written to the flash memory 150 and the backup processing is completed. Thus, the MPU 100 ends the operation of the disk array apparatus 10.

Next, a description will be specifically given of processing operations of the units when power is restored, power of the disk array apparatus 10 is turned on, and the power-supply unit 160 starts power supply.

When the power of the disk array apparatus 10 is turned on, the MPU 100 determines that the normal turn-off processing has not been performed, on the basis of the internal state of the disk array apparatus 10, and causes the block access request counter 30 to operate in the restoring mode (refer to step S140 in FIG. 2). At this point, using power supplied from the external power source, the battery unit 170 starts charging of a battery.

Figure 10:
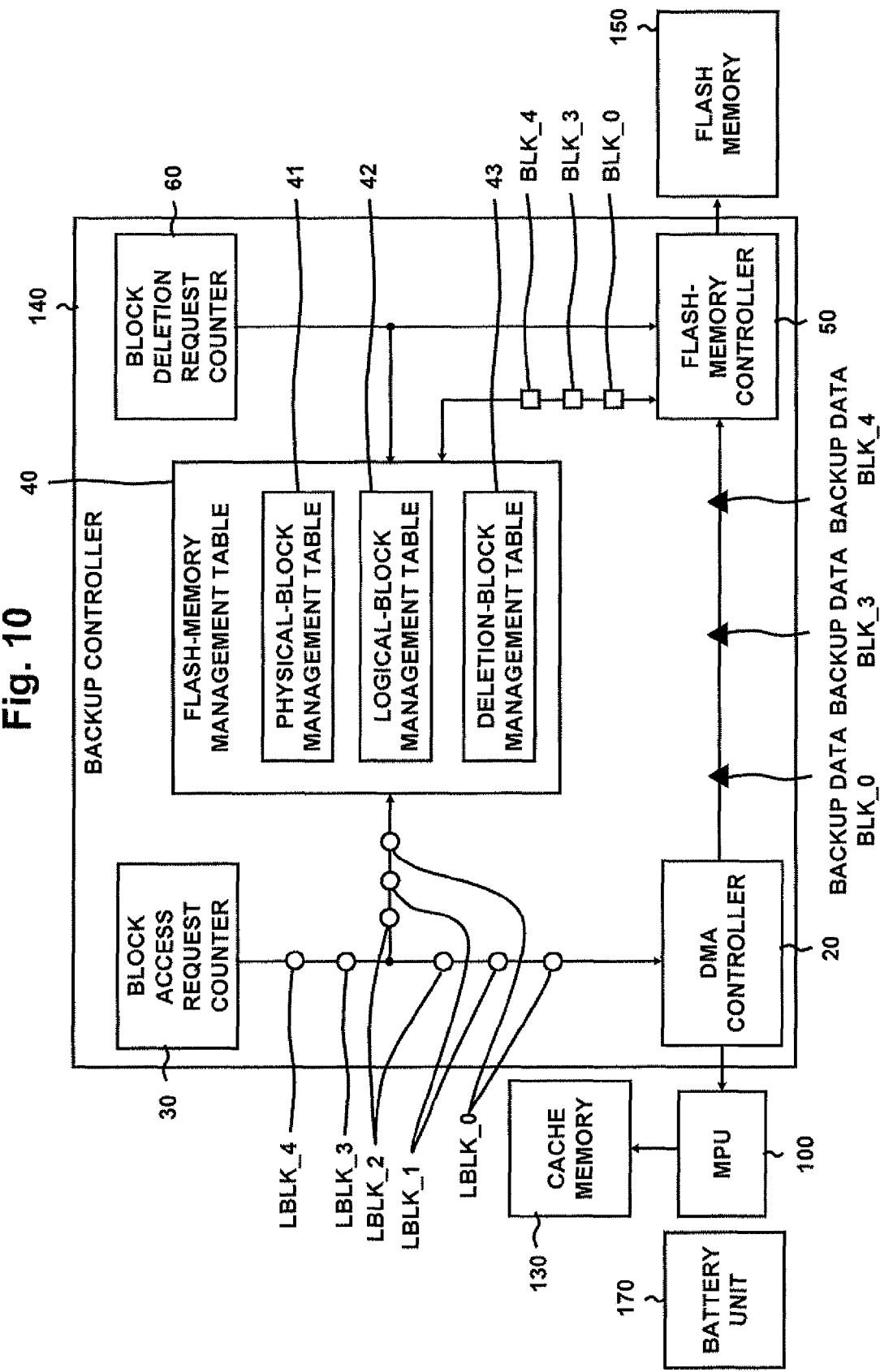

The block access request counter 30 that is operating in the restoring mode sequentially issues notifications indicating logical block numbers "LBLK_0" to "LBLK_A" to the DMA controller 20 and the flash-memory management table 40 (see circles in FIG. 10).

Each time the flash-memory management table 40 receives the notification indicating the logical block number, the flash-memory controller 50 refers to the physical-block management table 41 to convert the indicated logical block number into the physical block number (see rectangles in FIG. 10)

In the example shown in FIG. 5, when the flash-memory management table 40 initially receives the notification indicating logical block number "LBLK_0", the flash-memory controller 50 coverts logical block number "LBLK_0" into physical block number "BLK_0".

The flash-memory controller 50 then reads backup data from the block assigned the converted physical block number and transfers the backup data to the DMA controller 20 (see black triangles in FIG. 10).

The DMA controller 20, to which the backup data (see the black triangles in FIG. 10) is sequentially transferred from the flash-memory controller 50, as described above, writes the backup data to the cache memory 130, on the basis of the logical block numbers indicated by the notifications issued from the block access request counter 30.

When the block access request counter 30 counts the logical block numbers up to the last number "LBLK_A", all backup data is written to the cache memory 130 and thus the restoring processing of the cache data is completed.

During the restoring processing, the battery unit 170 charges the battery, and the MPU 100 does not proceed to the next processing even when the restoring of the cache memory 130 is completed and stands by until a notification of battery-charge completion is received from the battery unit 170.

Figure 11:
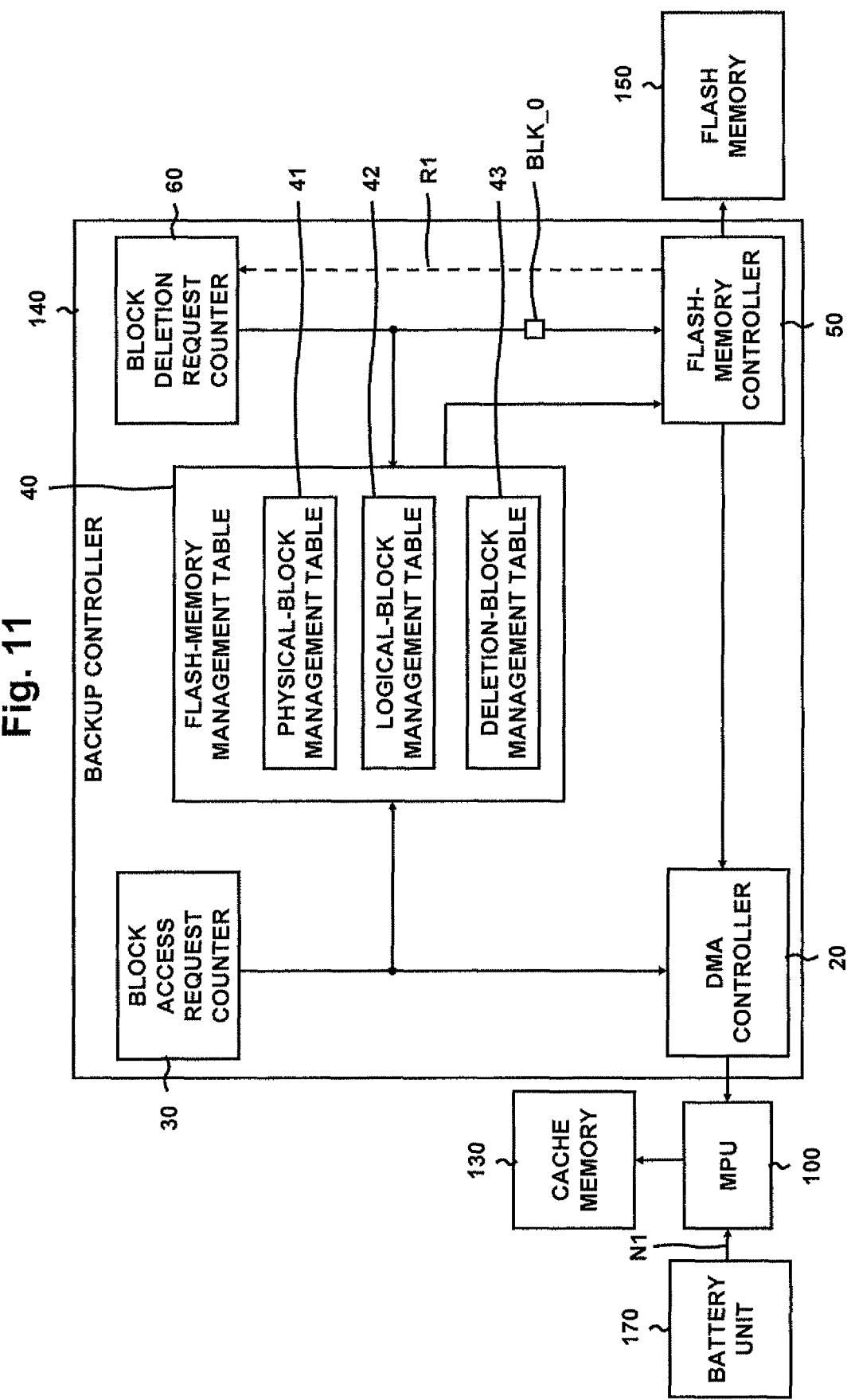
FIG. 11 is a block diagram illustrating processing operations of the units when data restoration is completed and deletion processing of the flash memory is performed.

Upon completion of the battery charge, the battery unit 170 issues a notification of battery-charge completion to the MPU 100 (see N1 in FIG. 11). Upon receiving the notification, the MPU 100 causes the block deletion request counter 60 to operate.

The block deletion request counter 60 refers to the flash-memory management table 40 to sequentially issue notifications indicating the physical blocks numbers, with the smallest first, to the flash-memory controller 50 (see a rectangle in FIG. 11).

Further, with respect to the flag for the indicated physical block number, the block deletion request counter 60 changes N to B (indicating "currently being deleted") in the deletion-block management table 43.

For example, as shown in FIG. 12, the block deletion request counter 60 changes N to B with respect to the flag for the initially indicated physical block number "BLK_0".

The flash-memory controller 50 starts to delete data in the block in the flash memory 150, the block corresponding to the indicated physical block number. Upon completion of the data deletion processing, the flash-memory controller 50 issues a notification of the deletion completion to the block deletion request counter 60 (see R1 in FIG. 11).

Upon receiving the notification, the block deletion request counter 60 changes B to E (indicating "already deleted") in the deletion-block management table 43, with respect to the flag for the indicated physical block number, and issues a notification indicating the next smallest physical block number to the flash-memory controller 50.

For example, as shown in FIG. 13, the block deletion request counter 60 changes B to E with respect to the flag for the initially indicated physical block number "BLK_0". The block deletion request counter 60 then issues a notification indicating the next smallest physical block number "BLK_3" to the flash-memory controller 50.

The flash-memory controller 50 sequentially receives the notifications indicating the physical block numbers from the block deletion request counter 60, as described above, and thus, starts to delete data in the blocks corresponding to the indicated physical block numbers, in the same manner described above. Upon completion of the data deletion processing, the flash-memory controller 50 issues a notification of the deletion completion to the block deletion request counter 60.

Thereafter, when the block deletion request counter 60 counts the physical block numbers up to the last physical block number, all backup data in the flash memory 150 is deleted and thus the deletion-block management table 43 returns to, for example, the state shown in FIG. 7.

When the block deletion request counter 60 issues a notification indicating the last physical block number and changes B to E with respect to the flag for the last physical block number, the block deletion request counter 60 issues a notification of the deletion processing to the MPU 100. Upon receiving the notification, the MPU 100 starts up the disk array apparatus 10 and causes it to perform normal operation as an auxiliary storage apparatus for the host computer 200 (refer to steps S120 and S130 in FIG. 2).

A power failure, however, may occur before the block deletion request counter 60 counts the last physical block number (this case corresponds to "No" in step S170 and "Yes" in step S180 in the flowchart shown in FIG. 2). Processing performed by the units in such a case will be described below in detail.

When the MPU 100 receives a notification of power-failure occurrence from the power-supply unit 160 before receiving the notification of the deletion-processing completion from the block deletion request counter 60, the MPU 100 stops the operation of the block deletion request counter 60. Thereafter, upon receiving the deletion completion notification issued from the flash-memory controller 50 to the block deletion request counter 60, the MPU 100 causes the block access request counter 30 to operate in the second storage mode.

The block access request counter 30 that is operating in the second storage mode searches the deletion-block management table 43 in the flash-memory management table 40 for the physical block number corresponding to the flag B.

The block access request counter 30 then uses the logical-block management table 42 to convert the found physical block number into the logical block number and determines that the counting is performed up to the converted logical block number.

The deletion processing for the data in the block corresponding to the found physical block number has been completed at this point, since the MPU 100 causes the block access request counter 30 to operate in the second storage mode after obtaining the deletion completion notification issued from the flash-memory controller 50 to the block deletion request counter 60. Thus, the block access request counter 30 changes B to E with respect to the corresponding flag.

The block access request counter 30 then issues notifications indicating logical block numbers from logical block number "LBLK_0" to the determined logical block number to the DMA controller 20 and the flash-memory management table 40.

The DMA controller 20 reads the cache data from the areas in the cache memory 130, the areas corresponding to the indicated logical block numbers, and transfers the read cache data to the flash-memory controller 50.

Each time the flash-memory management table 40 receives the notification indicating the logical block number, the flash-memory controller 50 refers to the deletion-block management table 43 to search for the smallest one of the physical block numbers of blocks that are currently free blocks in the flash memory 150.

The flash-memory controller 50 further stores the relationships between the indicated logical block and the found physical block number in the physical-block management table 41 and the logical-block management table 42. In this case, however, logical block numbers that are the same as the logical block numbers stored during the previous power failure may also exist in the logical-block management table 42, in which case, the flash-memory controller 50 updates the logical block numbers.

The flash memory 50, to which the cache data is sequentially transferred from the DMA controller 20, writes the cache data to the flash memory 150, on the basis of the found physical block number. During the writing, with respect to the flag for the physical block number of the block to which the cache data is actually written, the flash-memory controller 50 changes E to N (indicating "not-deleted" or "data stored") in the deletion-block management table 43.

When the block access request counter 30 counts the logical block numbers up to the above-described predetermined logical block number, all backup data deleted from the flash memory 150 is written to the flash memory 150. Thus, MPU 100 ends the operation of the disk array apparatus 10.

Figure 15:
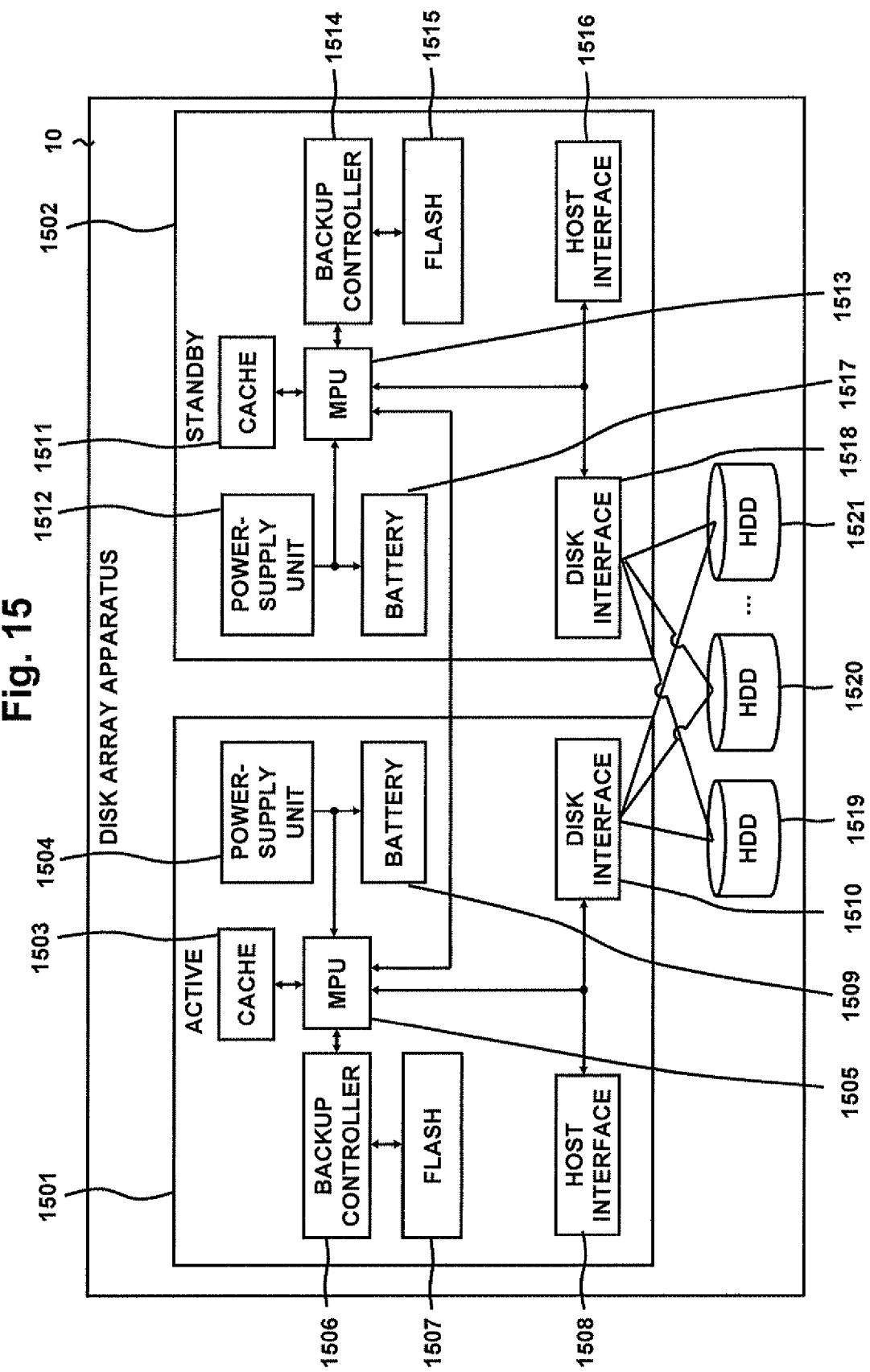
FIG. 15 is a block diagram showing a schematic configuration of a disk array apparatus having a redundant unit configuration except for disks.

As described above, the processing operation of the backup controller 140 is performed when power is restored and when a power failure occurs during the deletion of the flash memory 150. As shown in FIG. 15, the units of the disk array apparatus 10, except for the hard disks 1519 to 1521, may be constituted by a regular system and a backup system. The disk array apparatus 10 have RAID controllers 1501, 1502. The disk array apparatus 10 includes a cache memory 1503, 1511, a power-supply unit 1504, 1512, an MPU 1505, 1503, a backup controller 1506, 1514, a flash memory 1507, 1515, a host interface 1508, 1516, a battery unit 1509, 1517, a disk interface 1510, 1518, and hard disks 1519 to 1521.

Advantage of First Embodiment

According to the first embodiment, as described above, the deletion-block management table 43 manages the states of data stored into the flash memory 150. When a power failure occurs during the deletion processing of the flash memory 150, the backup controller 140 refers to the deletion-block management table 43 and re-saves, from the cache memory 130 into the flash memory 150, data corresponding to data deleted from the flash memory 150, on the basis of the data storage states. With this arrangement, the safety of the data deleted from the flash memory 150 can be ensured at reduced cost.

Second Embodiment

In the first embodiment described above, even when the restoring of the cache memory 130 is completed, the MPU 100 stands by without proceeding to the next processing, until it receives the battery-charge completion notification from the battery unit 170.

According to the present invention, however, even if a power failure occurs during the deletion of the flash memory 150, the deletion processing can be suspended and data corresponding to data deleted from the flash memory 150 can be written back from the cache memory 130 thereto.

In this case, if a power failure occurs soon after the deletion of the flash memory 150 is started, the amount of data to be written back is small and thus the amount of energy required for the write-back is also small. A case in which a largest amount of energy is required is a case in which a power failure occurs immediately before the deletion of the flash memory 150 is completed.

Accordingly, even if the process proceeds to the deletion processing before completion of the battery charge and a power failure occurs immediately after the start of the deletion of data from blocks from which the data is to be deleted, a notification indicating the physical block numbers of the blocks may be issued at a point of time when the deletion of the data from the blocks is completed and the amount of charge required for writing back data corresponding to the deleted data is reached.

Figure 14:
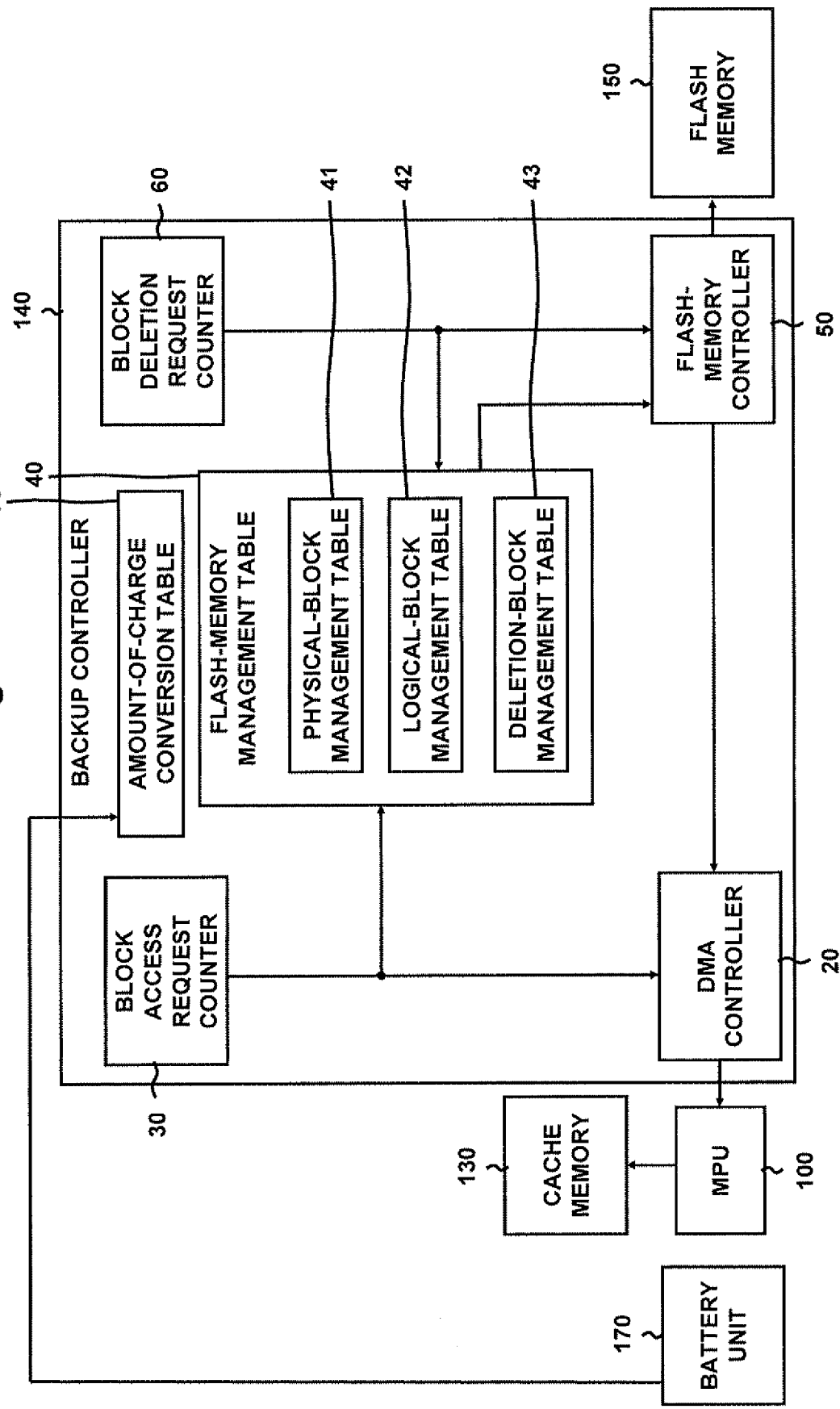
FIG. 14 is a block diagram showing the configuration of a backup controller according to a second embodiment of the present invention.

FIG. 14 is a block diagram showing the configuration of a backup controller 140 according to a second embodiment of the present embodiment. As shown, as in the first embodiment, the backup controller 140 includes a DMA controller 20, a block access request counter 30, a flash-memory management table 40, a flash-memory controller 50, and a block deletion request counter 60. Unlike the first embodiment, the backup controller 140 according to the second embodiment further includes an amount-of-charge conversion table 70.

On the basis of the amount of charge reported from the battery unit 170, the amount-of-charge conversion table 70 determines the number of blocks from which data can be deleted. The amount-of-charge conversion table 70 then issues a notification indicating the determined number of blocks to the block deletion request counter 60. For example, even if a power failure occurs immediately after deletion of data from a second block on which a second data-deletion operation is to be performed is started, the deletion of the data from the block is completed by the processing operations of the units, and when the amount-of-charge conversion table 70 receives, from the battery unit 170, a notification indicating the amount of charge that is enough for writing back data for the first block and the second block from which the data is already deleted, the amount-of-charge conversion table 70 determines that the number of blocks is 2.

Processing operations of the units after completion of the restoring processing of the cache data will be described below, in which descriptions of the same portions as those in the first embodiment are omitted.

Upon completion of the restoring of the cache memory 130, the MPU 100 immediately causes the block deletion request counter 60 to operate without waiting for the battery-charge completion notification.

The block deletion request counter 60 refers to the amount-of-charge conversion table 70 to obtain the number of blocks from which data can be deleted. When the number of blocks from which data can be deleted is 1 or more, the block deletion request counter 60 sequentially issues a notification or notifications indicating the physical block number(s), with the smallest first, to the flash-memory controller 50.

Upon receiving a notification of deletion completion from the flash-memory controller 50, the block deletion request counter 60 refers to the amount-of-charge conversion table 70 to obtain the number of blocks from which data can be deleted. At this time, when the number of blocks from which data can be deleted is 2 or more, the block deletion request counter 60 issues a notification indicating the next smallest one (i.e., the second smallest one) of the physical block numbers to the flash-memory controller 50.

As in the manner described above, the block deletion request counter 60 refers to the amount-of-charge conversion table 70 each time it receives a notification of deletion completion. When the number of blocks from which data can be deleted is x or more, the block deletion request counter 60 issues a notification indicating the xth smallest one of the physical block numbers to the flash-memory controller 50. When the number of blocks from which data can be deleted is smaller than a required number, the block deletion request counter 60 monitors the amount-of-charge conversion table 70. When the number of blocks from which data can be deleted reaches the required number, the block deletion request counter 60 issues a notification indicating the physical block number to the flash-memory controller 50.

Advantage of Second Embodiment

According to the second embodiment, as described above, the battery charge and the flash-memory deletion are performed simultaneously to thereby make it possible to reduce the amount of time from when the power of the disk array apparatus is turned on until it is started up.

The following appendices are further disclosed with respect to illustrative embodiments including the first and second embodiments described above.

All examples and conditional language recited herein are intended for pedagogical purposes to aid the reader in understanding the invention and the concepts contributed by the inventor to furthering the art, and are to be construed as being without limitation to such specifically recited examples and condition, nor does the organization of such examples in the specification relate to a showing of superiority and inferiority of the invention. Although the embodiment of the present inventions have been described in detail, it should be understood that the various changes, substitutions, and alternations could be made hereto without departing from the spirit and scope of the invention.

What is claimed is:

1. An information processing apparatus operable with power from an external power source, the information processing apparatus comprising:
    a volatile memory that stores data;
    a nonvolatile memory to backup the data stored in the volatile memory;
    a battery unit that supplies power to the information processing apparatus when the power from the external power source to the information processing apparatus is stopped, the battery unit being charged by the external power source; and
    a controller that controls backup of the data in accordance with a process including:
        saving the data stored in the volatile memory into the nonvolatile memory when the power from the external power source to the information processing apparatus is stopped,
        writing back the data saved in the nonvolatile memory into the volatile memory upon recovery of the power from the external power source,
        deleting the data saved in the nonvolatile memory after the writing back,
        resaving, from the volatile memory into the nonvolatile memory, data deleted from the non-volatile memory when the controller detects that the power has again stopped while deleting the data saved in the nonvolatile memory,
        receiving a notification of an amount of battery-charge from the battery unit when the writing back of the data saved in the nonvolatile memory into the volatile memory is completed after the power is recovered from the external power source,
        calculating a number of data that is deleted based on the received amount of the battery-charge, and
        deleting a calculated number of data from among the data saved in the nonvolatile memory after the writing back of the data.

* * * * *

UNITED STATES PATENT AND TRADEMARK OFFICE
CERTIFICATE OF CORRECTION

PATENT NO. : 8,838,918 B2  
APPLICATION NO. : 12/362630  
DATED : September 16, 2014  
INVENTOR(S) : Sadayuki Ohyama et al.

Page 1 of 1

It is certified that error appears in the above-identified patent and that said Letters Patent is hereby corrected as shown below:

On the Title Page, Column 2, Item [74] (Attorney, Agent, or Firm), Line 1, Delete "Stass & Halsey LLP" and insert -- Staas & Halsey LLP --, therefor.

Signed and Sealed this  
Sixth Day of January, 2015

Michelle K. Lee  
*Deputy Director of the United States Patent and Trademark Office*